United States Patent [19]
Way

[11] Patent Number: 5,768,280
[45] Date of Patent: Jun. 16, 1998

[54] TWO-WAY BROADBAND CATV COMMUNICATION NETWORK PROTOCOL AND MONITORING TECHNOLOGY

[76] Inventor: Winston L. Way, Dept. of Commun. Engineering National Chiao Tung University, Hsinchu, Taiwan

[21] Appl. No.: 730,960

[22] Filed: Oct. 16, 1996

Related U.S. Application Data

[63] Continuation of Ser. No. 371,738, Jan. 12, 1995, abandoned.

[51] Int. Cl.$^6$ .................. H04N 7/173; H04J 1/00
[52] U.S. Cl. ............. 370/486; 370/449; 340/825.08; 348/6; 455/3.1
[58] Field of Search .................. 370/24, 30, 32, 370/69.1, 73, 85.7, 85.8, 95.1, 95.2, 319, 344, 431, 480, 485, 486, 487; 340/825.06, 825.07, 825.08, 825.52, 825.54; 348/6, 7, 10, 12, 13; 455/3.1, 4.1, 4.2, 5.1, 2

[56] References Cited

U.S. PATENT DOCUMENTS

| | | | |
|---|---|---|---|
| 4,361,903 | 11/1982 | Ohta | 455/2 |
| 4,455,570 | 6/1984 | Saeki et al. | 455/5.1 X |
| 4,477,800 | 10/1984 | O'Brien | 348/10 X |
| 4,558,464 | 12/1985 | O'Brien, Jr. | 348/10 |
| 4,644,526 | 2/1987 | Wu | 370/30 |
| 5,255,086 | 10/1993 | McMullan, Jr. et al. | 348/12 |
| 5,361,091 | 11/1994 | Hoarty et al. | 348/7 |

*Primary Examiner*—Hassan Kizou
*Attorney, Agent, or Firm*—Meltzer, Lippe, Goldstein, Wolf and Schlissel, P.C.

[57] ABSTRACT

A medium-access protocol is disclosed for use in a communication network to provide a two-way broadband communication network. The communication network comprises a central network controller (CNC) and a plurality of user nodes, and the protocol comprises the steps of: (a) providing an RF modulator and a receiver tuner for each of the user nodes; (b) allocating a plurality of vacant CATV channel for the CNC, each channel being assigned a separate frequency band; (c) causing a first user node, which intents to communicate with a second user node, to send a request-to-communicate signal to the CNC via a first frequency band centered at first frequency, the first user node having a first RF modulator and a first receiver tuner, and the second user node having a second RF modulator and a second receiver tuner; (d) causing the CNC to send a checking signal to the second user via a second frequency band centered at second frequency to see whether the second user is busy; (e) if the second user is not busy, then causing the CNC to assign a third frequency band centered at a third carrier frequency to the first RF modulator provided for the first user node and a fourth frequency band centered at a fourth carrier frequency to the second RF modulator provided for the first user node, and tuning the first receiver tuner to the fourth carrier frequency and tuning the second receiver tuner to the third carrier frequency; and (f) causing the first user node and the second user node to communicate via the third and fourth frequency bands. With this protocol, about 600 (analog) to 10,000 (digital) pairs of users can be allowed to communicate with each other at the same time. A security checking procedure can be provided by: (a) roll-call polling each user node to check a status thereof; and (b) warning a network manager if no response is received from any of the user nodes within a predetermined period of time.

7 Claims, 5 Drawing Sheets

TWO-WAY BROADBAND CATV COMMUNICATION NETWORK PROTOCOL AND MONITORING TECHNOLOGY

This is a continuation of application Ser. No. 08/371,738, filed Jan. 12, 1995, now abandoned.

BACKGROUND OF THE INVENTION

This invention relates to communication network protocols and monitoring technologies in a two-way broadband cable television ("CATV") system. Conventionally the term CATV originally stands for Community Antenna TeleVision; in the present invention, it is used to represent Cable TeleVision.

CATV networks are becoming the most important broadband communication networks for applications such as broadcasting multiple channels of movies, home shopping, education and entertainment programs, and even video-on-demand services. However, the traffic on CATV networks is basically "asymmetric"; i.e., although there is provided a broadband data stream being sent from the CATV headed to all subscribers' premises (i.e., downstream signals), there is only a narrowband control data stream going upstream from the subscribers' premises to the headend. If we want to have two-way broadband communications such as video-conferencing via CATV networks, which encompass 92% of U.S. households, the current CATV networks simply will not work. One way to upgrade CATV networks to two-way broadband is by using asynchronous transfer mode (ATM) switches at the CATV headend. However, to do so, not only the cost of ATM switch is currently high, the cost of providing customer premises equipment (CPE), such as workstations and ATM adapter card, will also be prohibitively high. An object of the present invention is thus to provide, in a broadband CATV network, medium-access protocols which do not require broadband switches.

Another object of the present invention is to provide a simple method to monitor the status of all users and cable conditions (breaks, stealth, etc.) on a CATV communication network.

SUMMARY OF THE INVENTION

The medium-access protocol disclosed in the present invention can be described, in a nutshell, as "broadcast and authorized select". As shown in FIG. 1, the CATV network under consideration is a hybrid network, which is composed of a mixture of optical fiber trunk lines and coaxial cable branches. The network can also be composed of all coaxial cables only. Optical fibers can increase the network coverage area but they are not absolutely necessary. As shown in FIG. 1, a network user A first sends his request to a central network controller (CNC) for communicating with another network user B. The request is sent to CNC via a signaling unit which has an RF modulator with a carrier frequency $f_x$. The CNC uses another signaling unit which has an RF modulator and a carrier frequency $f_c$ to check if user B is currently busy. If user B is not busy, the CNC will then assign a 6 MHZ channel centered at $f_1$ for user A to transmit his multimedia signals to user B, and assign another 6 MHZ channel centered at $f_2$ for user B to transmit his multimedia signals to user A.

The assignment is completed by sending a control signal from the CNC to user A and tune user A's analog (or digital) RF modulator to $f_1$, and, at the same time, tune user A's receiver tuner to $f_2$. Similar process is executed at user B's location. The CATV channels are centered at and taken from a pool of vacant CATV channels. Depending on whether the modulation formats are digital or analog, and whether the vacant channel frequency range that can be provided is between 50 and 450, between 50 and 550, between 50 and 1000, or between 550 and 1000 MHZ, the available number of vacant channels that can be obtained can range from about 60 analog channels to over 1000 digital channels. Assuming a utilization rate of 10%, a network using the communication network protocol disclosed in the present invention can therefore offer 600 to 10,000 pairs of users communicating with each other. The present invention is therefore a cost-effective alternative to the method of using a broadband switch for use in a circuit-switched environment such as tele-videoconferencing.

A second part of the invention is regarding the network security. In a CATV environment, an unauthorized user can tune his receiver tuner to any CATV channel and illegally interfere with other users' privacy. Instead of using common methods of scrambling/unscrambling for analog channels and encryption/decryption for digital channels, the present invention allows a simple method of polling to be used to provide network security. In the method disclosed in the present invention the CNC can use a polling modem to poll each user's signaling unit and check the user's status which includes sending request, busy, or no responding, etc. In the method disclosed in the present invention, each user's signaling unit must respond to the CNC's polling within a pre-assigned time period. If no response is received from the user, the CNC can then warn the network manager that either a cable or an RF component has failed, or a pirate might have broken into the network.

DETAILED DESCRIPTION OF PREFERRED EMBODIMENTS

Figure 1:
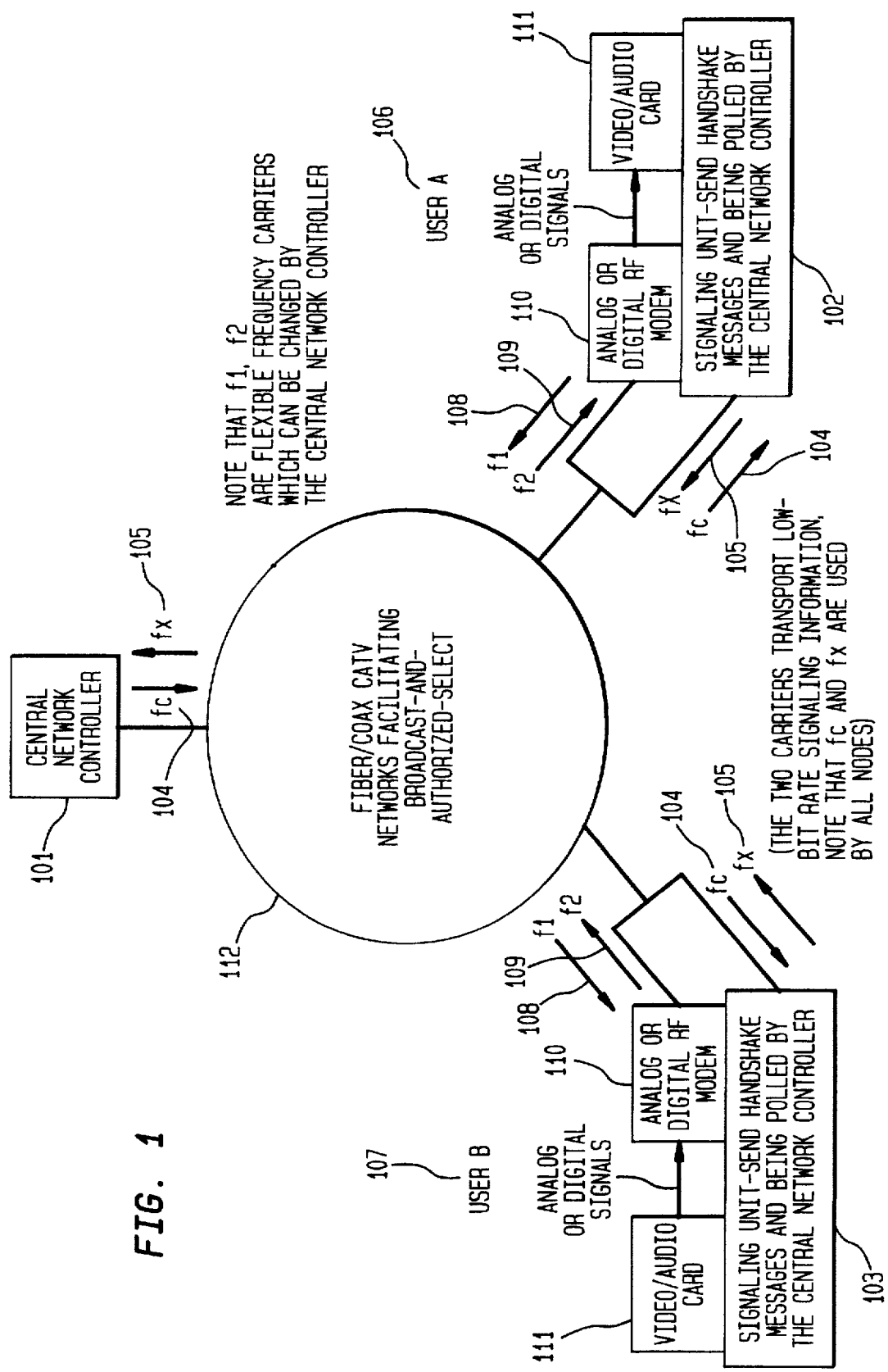
FIG. 1 is a simplified two-way broadband CATV network disclosed in the present invention which includes a central network controller (CNC) and two users: A and B. Each user is equipped with both a video and an audio card, an analog or digital RF modem, which includes a modulator and a receiver tuner, and a signaling unit to do handshaking with the CNC.

With reference to FIG. 1, a central network controller (CNC) 101 communicates with all users' signaling units (e.g., 102 and 103 in FIG. 1) via a fixed frequency band centered at $f_c$ 104, and all users respond to CNC via a fixed frequency band centered at $f_x$ 105. The purpose of the communications within the bands $f_c$ 104 and $f_x$ 105 is that the CNC 101 can check if any user has requested to communicate with other users, if the corresponding user is busy, if the user is out of the premises, or if there is a voice or video message left from user A to user B, etc. For example, a network user A 106 first sends his request to CNC 101 asking to communicate with network user B 107. The request is sent to CNC via a signaling unit 102 which has an RF modulator with a carrier frequency $f_x$ 105. The CNC 101 uses its own signaling unit, which has an RF modulator and a carrier frequency $f_c$ 104, to check if user B 107 is currently busy. If user B 107 is not busy, then user A and B are ready for CNC to setup a connection for them. This handshaking process which we described above is termed "call setup process".

At low-speed data rates (<1 megabit per second), the call setup process can use conventional network protocols such as the carrier-sense-multiple-access/collision-detection (CSMA/CD) protocol, which is commonly used in today's Ethernet local area networks, roll-call or hub polling, etc. (see, e.g., M. Schwartz, "Telecommunication Networks," Chaps. 8–9, pp. 403–482, Addison-Wesley Publishing Co., 1987).

Figure 2:
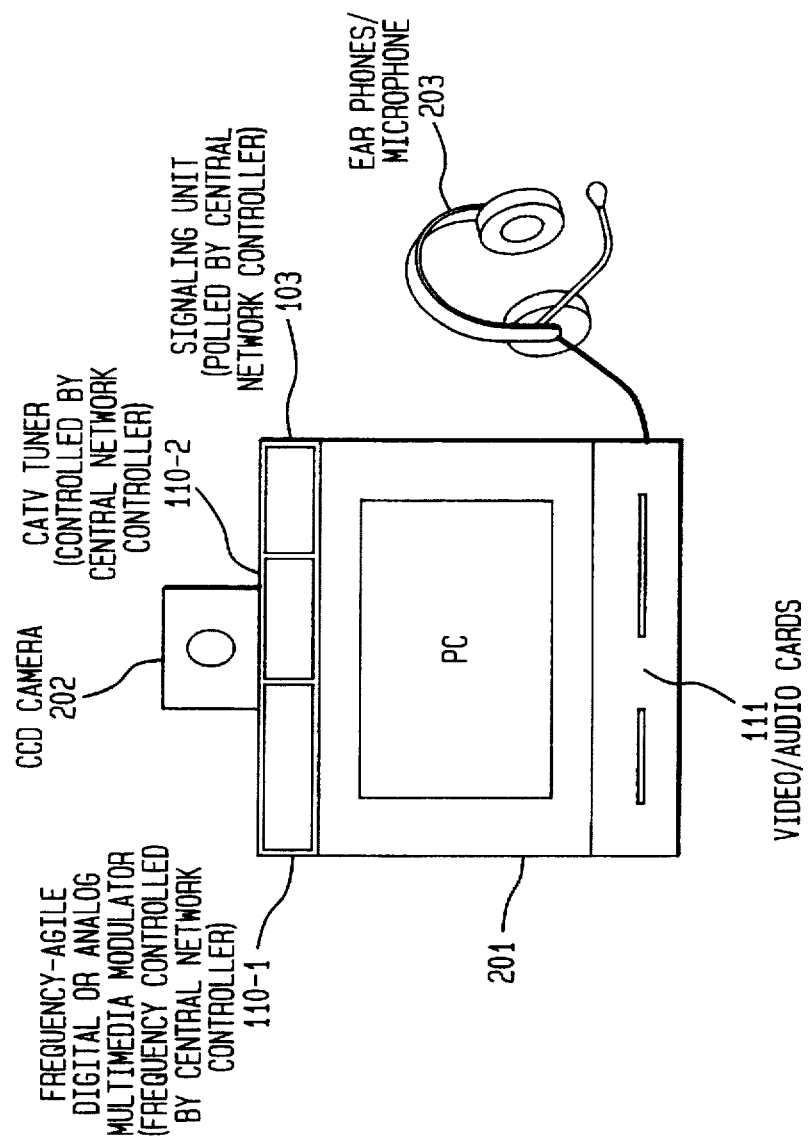
FIG. 2 is a detailed drawing of a subscriber's Customer Premises Equipment, CPE, according to a preferred embodiment of the present invention.

After the call setup process is completed, CNC 101 will then send a second wave of control signals (also via the frequency band at $f_c$ 104) to users A and B in order to establish a circuit connection: in the above example, if user B 107 is not busy, the CNC 101 will then assign a 6 MHZ channel centered at $f_1$ 108 for user A 106 to transmit his multimedia signals to user B 107, and assign another 6 MHZ channel centered at $f_2$ 109 for user B 107 to transmit his multimedia signals to user A 106. The assignment is completed by sending a control signal from the CNC to user A and tune user A's analog (or digital) RF modulator 110-1 to $f_1$ 108, and in the same time tune user A's receiver tuner 110-2 to $f_2$ 109. Similar process is executed at the user B's location. A detailed customer premises equipment (CPE) is shown in FIG. 2, in which it is shown a personal computer (PC) 201, a CCD camera 202, an earphone/microphone 203, and the three previously mentioned equipment, i.e., the frequency-agile digital or analog RF modulator 110-1, the CATV receiver tuner 110-2, and the signaling unit 103.

The CATV channels centered at $f_1$ 108 and $f_2$ 109 are taken from a pool of vacant CATV channels. Depending on whether the modulation format is digital or analog, and whether the available channel frequency range is from 50 to 450, from 50 to 550, from 50 to 1000, or from 550 to 1000 MHZ, etc., the number of available vacant channels can range from about 60 analog channels to over 1000 digital channels. Assuming a circuit utilization rate of 10%, a network using the protocol disclosed in the present invention can therefore offer 600 to 10000 pairs of users communicating with each other.

Figure 3:
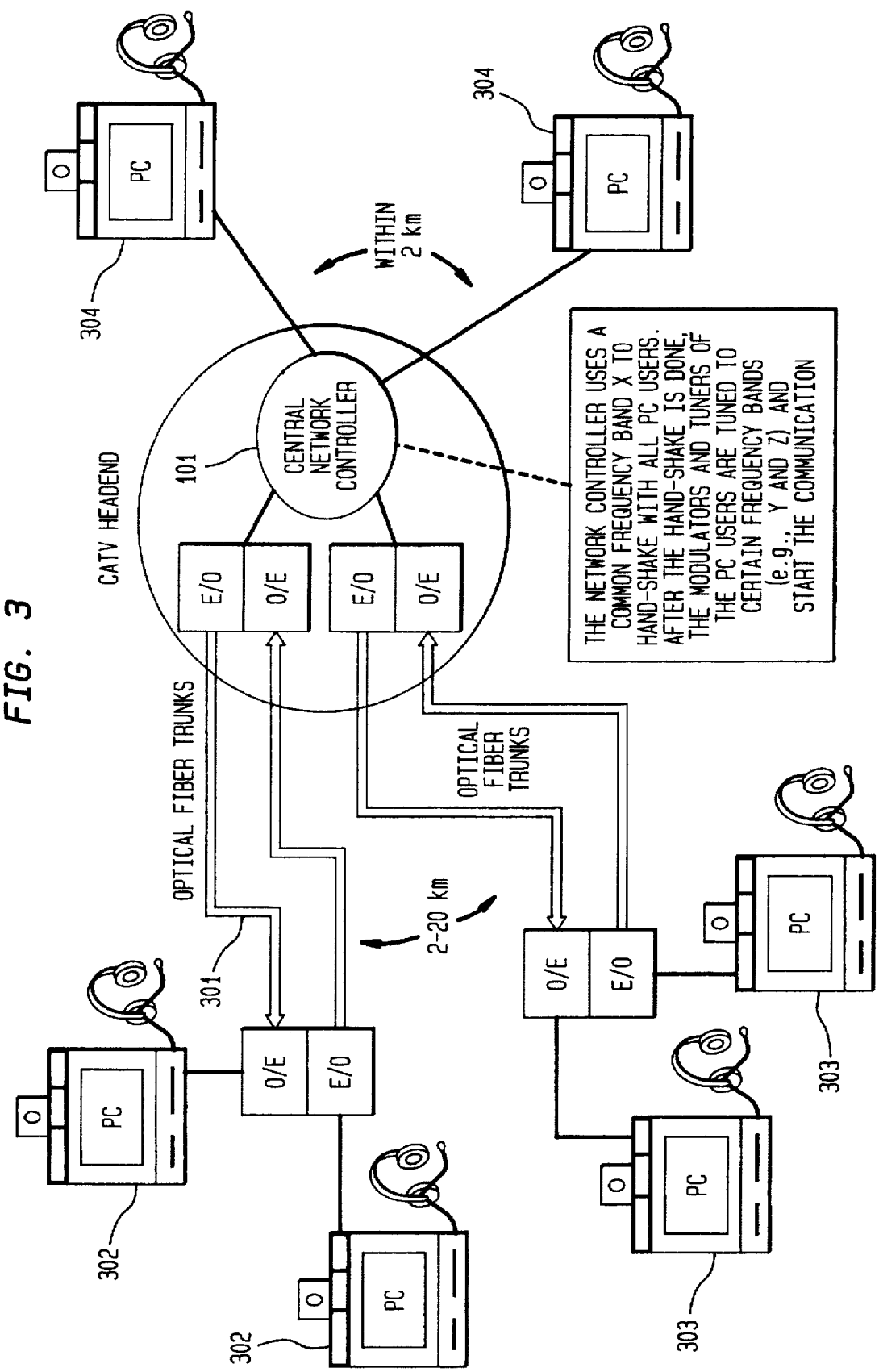
FIG. 3 is a general architecture of a fiber/coax multimedia CATV network according to a preferred embodiment of the present invention.
Figure 4:
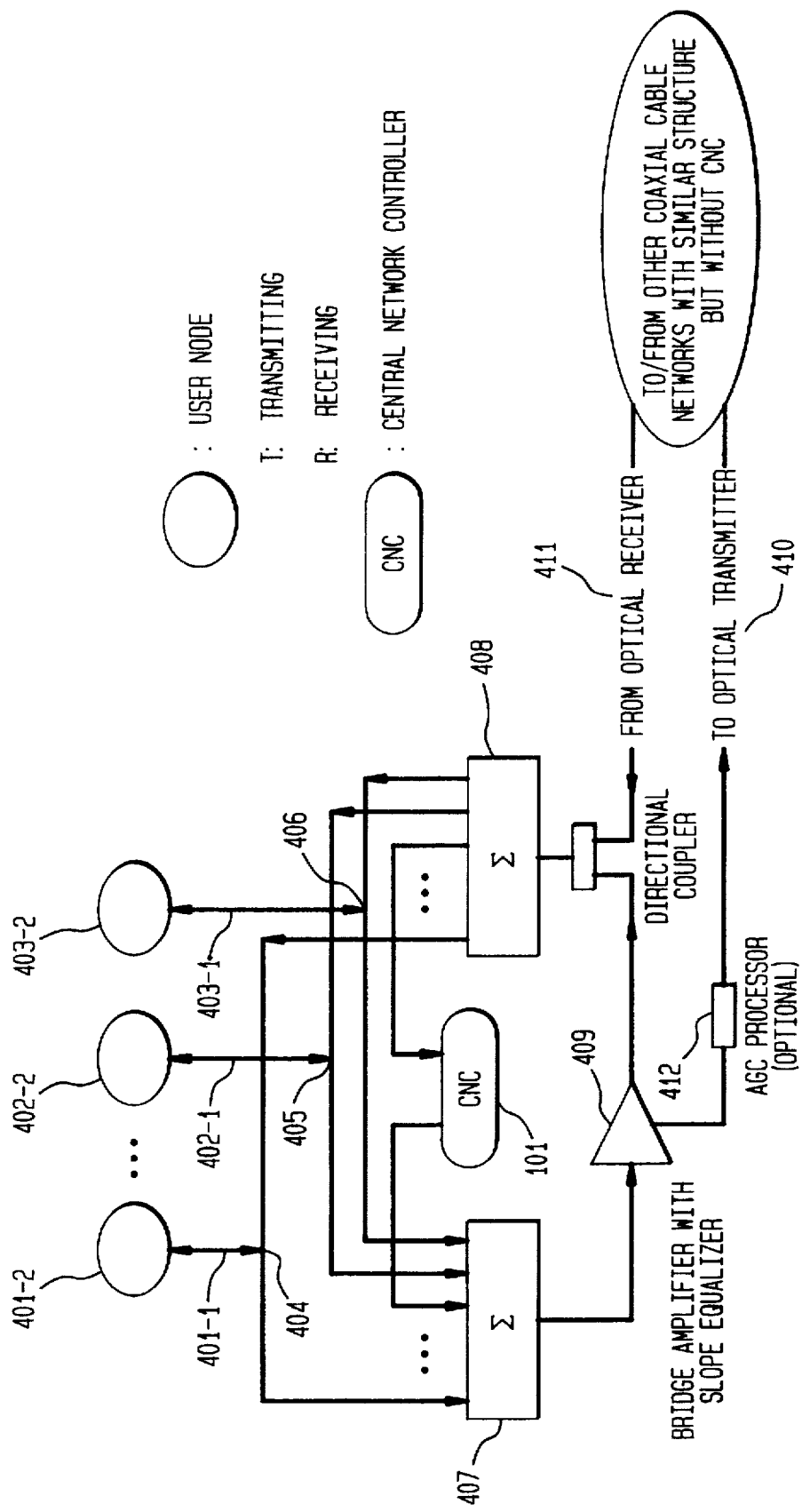
FIG. 4 is a detailed all-coaxial cable architecture with a single cable connected to each node; the coaxial cable architecture may be a part of a fiber/coax network.
Figure 5:
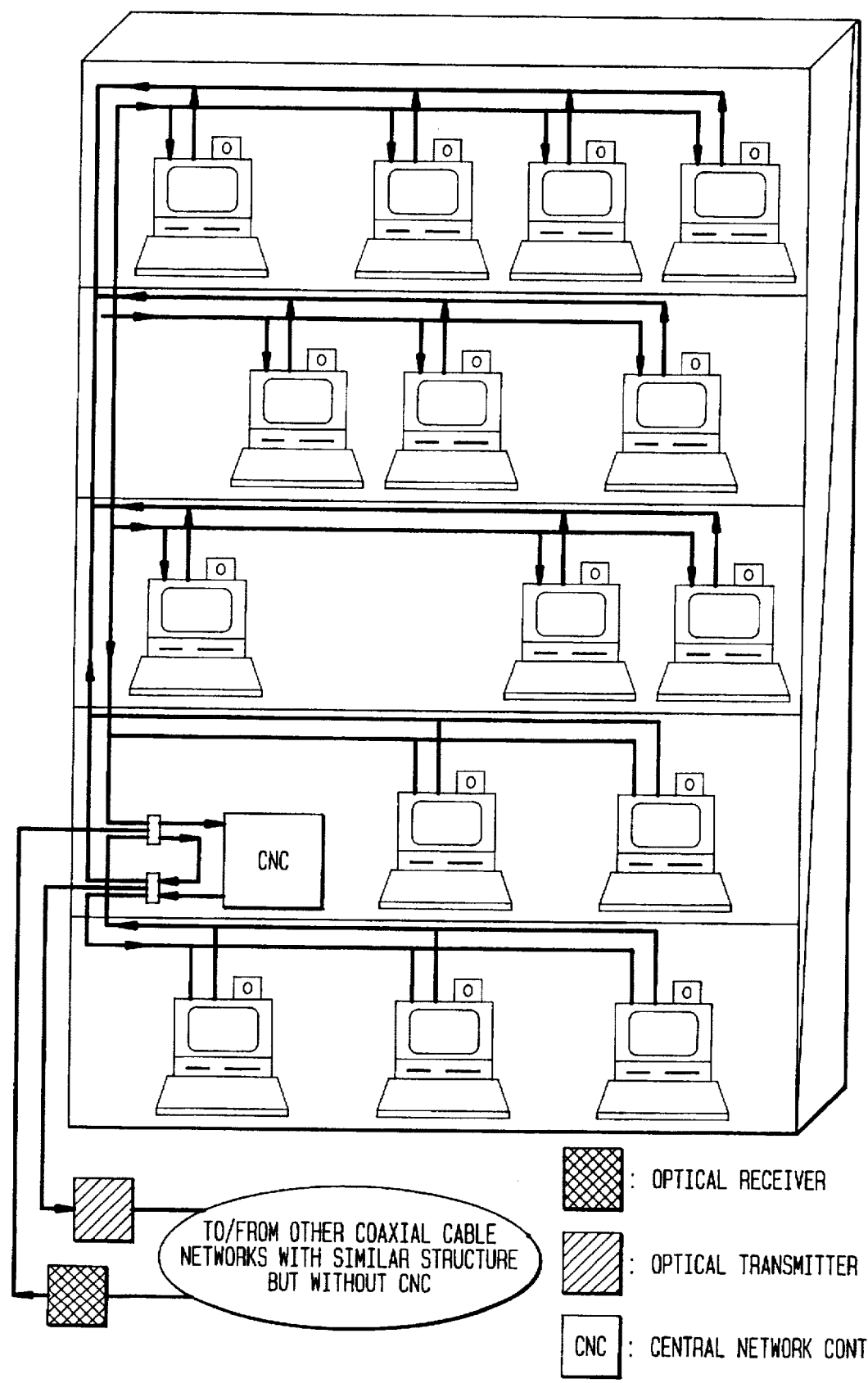
FIG. 5 is a detailed all-coaxial cable architecture with tree-and-branch arrangement and two cables connected to each node; the coaxial cable architecture may be a part of a fiber/coax network.

Regarding the transmission media in the CATV communication network, as disclosed heretofore, it can be a mixture of optical fiber and coaxial cable, as shown in 112 of FIG. 1. We further illustrate the network architecture as shown in FIG. 3, FIG. 4, and FIG. 5. The general network configuration is shown in FIG. 3, where optical fiber trunk lines 301 interconnect several groups of users (302, 303, and 304). Users in each group are interconnected by coaxial cables. The coaxial cable interconnection in each group can be illustrated by two examples as shown in FIG. 4 and FIG. 5. FIG. 4 shows a coaxial cable star architecture with a single cable (401-1, 402-1, 403-1) connected to each user node (401-2, 402-2, 403-2). At the location where the CNC 101 is located, each cable (401-1, 402-1, 403-1) is connected to a 1 by 2 splitter (404, 405, 406) which in one way transmit signals to a 1 by N adder 407, and in the other way receive all users' signals from a second 1 by N adder 408. Although each user can receive all other users' signals, he or she is allowed to tune to an "authorized" channel by listening to the commands from the CNC 101. A wideband CATV amplifier 409 is used to compensate the significant loss due to the two 1 by N splitters 407 and 408. In order for this group of coaxial-cable-interconnected users to communicate with groups of users in other areas, optical transmitters and optical receivers can be located in 410 and 411. The AGC processor 412 is used to equalize the amplitudes all RF channels before sending to an optical transmitter. FIG. 5 shows a second coaxial-cable architecture, i.e., tree-and-branch architecture with two cables connected to each user node. The advantage of this architecture is that it is following the conventional CATV architecture, and the CATV amplifiers can be used wherever needed to compensate the cable loss, and the 1 by N splitters (407 and 408) in FIG. 4 can be eliminated. The disadvantage is that two cables must be deployed at each customer's site.

A second part of the invention is regarding monitoring of the network security and reliability In a conventional CATV environment, an unauthorized user can tune his receiver tuner 110-2 to any CATV channel and illegally interfere with other users' privacy. In the present invention, instead of using common methods of scrambling/unscrambling for analog channels and encryption/decryption for digital channels, it is disclosed a simple method of roll-call polling which has been conventionally used for communication but not monitoring purpose. In the method disclosed in the present invention, CNC 101 can use a polling modem to poll each user's signaling unit 103 and check the user's status, which includes sending request, busy, no response, etc. In the present invention, each user's signaling unit 103 must respond to the CNC's polling within a pre-assigned short time period. If no response is received from the user in due time, the CNC 101 can then warn the network manager that either a cable or RF component failed, or a pirate might have broken into the network. The network manager can simultaneously broadcast warning messages to all users and go to check the network's trouble spot.

The above described embodiments are illustrative of the principles of the present invention. Other embodiments can be devised by those skilled in the art without departing from the spirit and scope of the present invention.

What we claimed are:

1. In a CATV network capable of delivering program video information to each of plural user nodes, a medium-access protocol for providing two-way video communication on vacant channels not already used for delivering program video information between a first user node attached to a first group of nodes and a second user node attached to a second group of nodes, wherein said first and second groups of nodes are connected to a head end comprising a central network controller (CNC), said protocol comprising the steps of:

(a) allocating a plurality of vacant CATV channels that do not carry said program video information for dynamic assignment by said CNC to communicating user nodes, each channel being assigned a separate frequency band;

(b) at said first user node, transmitting a request-to-communicate signal to said CNC via a first frequency band centered at a first frequency;

(c) transmitting from said CNC to said second user node via a second frequency band centered at a second frequency a checking signal to determine if said second user node is busy;

(d) if said second user node is not busy, assigning a third frequency band centered at a third carrier frequency to said first user node for transmitting information to said second user node and assigning a fourth frequency band centered at a fourth carrier frequency to said second user node, for transmitting information to said first user node;

(e) tuning a transmit modulator at said first user node to said third frequency, a transmit modulator at said second node to said fourth frequency, and a receive modulator at said second user node to said third frequency;

(f) transmitting a first signal modulated onto said third frequency from said first user node to said head end;

(g) at said head end, adding said first signal to each of said signals transmitted by said CNC, and each other node of said first and second groups to produce a combined signal;

(h) transmitting said combined signal to said first and second groups of nodes connected to said head end; and (i) demodulating said first signal from said third frequency and one or more of said signals transmitted from said CNC, at said second user node.

2. A medium-access protocol according to claim 1 wherein said CATV network has a centralized star architecture or a tree-and-branch architecture connected via a single or two cables.

3. A medium-access protocol according to claim 1 which further comprising a security checking protocol, said security checking protocol comprising the step of:

roll-call polling each user node to check a status thereof; and warning a network manager if no response is received from any of said user nodes within a predetermined period of time.

4. A medium-access protocol according to claim 1 wherein said CATV network comprises a mixture of coaxial cables and optical cables.

5. A medium-access protocol according to claim 1 wherein said CATV network comprises only coaxial cables.

6. A medium-access protocol according to claim 1 wherein each of said CATV channels has a bandwidth of 6 MHZ.

7. A medium-access protocol according to claim 1, further comprising the steps of:

tuning a receive modulator at said first user node to said fourth, frequency;

transmitting a second signal modulated onto said fourth frequency from said second user node to said head end whereby said combined signal further comprises said second signal; and demodulating said second signal from said fourth frequency at said first user node.

* * * * *